Feb. 3, 1970

J. W. EDWARDS 3,493,289

COATED OPTICAL DEVICES

Filed Dec. 23, 1966

INVENTOR
JAMES W. EDWARDS
BY
*Robert J. Schaap*
ATTORNEY

# United States Patent Office 3,493,289
Patented Feb. 3, 1970

3,493,289
COATED OPTICAL DEVICES
James W. Edwards, Creve Coeur, Mo., assignor to Monsanto Company, St. Louis, Mo., a corporation of Delaware
Filed Dec. 23, 1966, Ser. No. 604,339
Int. Cl. B29d 11/00; B44d 1/14, 5/06
U.S. Cl. 350—166   3 Claims

ABSTRACT OF THE DISCLOSURE

An optical device having a substrate with an optically thin film on the substrate for selective reflectance and transmittance of radiation. The thin film comprises a plurality of low index refraction material layers and a plurality of high index refraction material layers. The layers of high index of refraction are formed of manganese sulfide.

---

Figure 2:
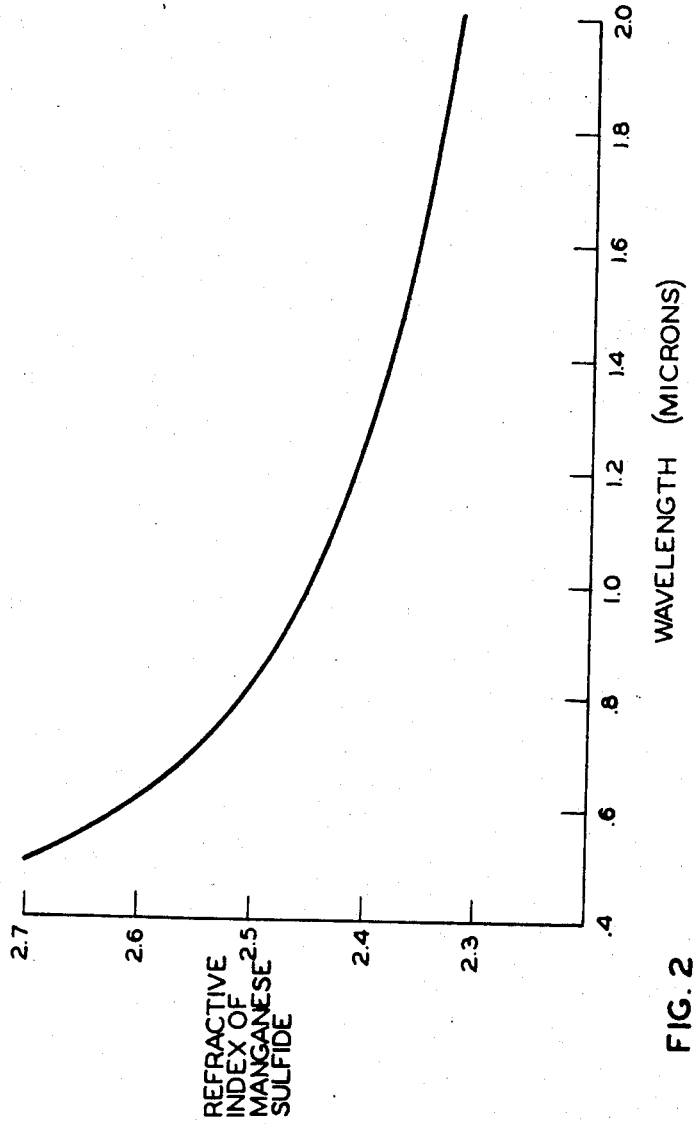

This invention relates in general to certain new and useful improvements in optical devices, and more particularly, to compounds used in the preparation of optically thin films used in optical devices.

In recent years, there has been an increasing interest in the use of optically thin films, often referred to as "interference filters," for selectively altering the optical characteristics of various optical devices. The increasing use and study of optically thin films are in part due to the rapid strides which have been made in the techniques of producing multilayer thin films. With the diversity of uses of optically thin films, various new methods of thin film application have recently been developed. The most extensively employed methods of film application include the electrolytic deposition method, the chemical method, the method of sputtering, and the method of evaporation.

Although films of many metals may be easily formed by the electrolytic deposition method which consists of an electrolysis process, it has not been widely used. This method suffers from the disadvantage that the properties of the film are dependent on a number of factors which are not readily controllable. Moreover, the fact that these films are produced in the presence of an electrolyte makes it likely that they will contain absorbed foreign molecules. Chemical methods of film deposition are used only in selected cases since it is often difficult to control the process of deposition and moreover, it is difficult to control the purity of the film.

For certain metals, such as platinum and molybdenum which have high melting points, the sputtering technique of film deposition is often employed. This process consists of maintaining a discharge in an inert gas at a relatively high distention. The surface of a cathode, being made of the metal to be sputtered, is subjected to local boiling which results from the bombardment of the cathode by positive ions. However, this method of film deposition has not been largely successful since the maintaining of an accurate beam density and deposition temperature is critical. Moreover, condensation often occurs on the cathode surface which interferes with the sputtering.

The most extensively used method of film deposition is that of thermal evaporation since it possesses many advantages over the other above described methods. Some of these advantages lie within the ease in which the process may be controlled. Moreover, films of high purity are readily produced with a minimum of interfering conditions. In spite of this favorable aspect, recent studies have shown that the properties of evaporated films have not always shown the consistency which is expected. Furthermore, the evaporation method is not universally applicable in practice for high melting point material. This is a particularly serious defect when this method is used for the preparation of multi-layer optically thin films. Many of the multi-layer thin films presently employed consist of alternating layers of dielectric material having low and high indexes of refraction. The materials employed for layers having high indexes of refraction, for the most part, consist of compounds which are not very volatile and hence are not readily adaptable for film deposition by the thermal evaporation process. Moreover, these compounds present other formidable technical problems due to the high temperatures of evaporation and therefore are not readily useable for objects having large surface areas to be controlled.

It is therefore the primary object of the present invention to provide a selected compound having a high refractive index and which is capable of being applied as a thin film by the thermal evaporation process at relatively low temperatures.

It is also an object of the present invention to provide a method of forming a thin film compound of the type stated.

It is another object of the present invention to provide a selected thin film compound of the type stated which has good adherence properties and good abrasion resistant properties.

It is a further object of the present invention to provide a selected thin film compound of the type stated which has desired properties for use in multi-layer dielectric films.

It is an additional object of the present invention to provide a selected thin film compound of the type stated which is relatively inexpensive and is commerically available.

It is another salient object of the present invention to provide a selected thin film compound of the type stated which readily lends itself to use in a wide variety of optical applications.

Other objects and advantages of this invention will be apparent to one skilled in the art upon studying the specification.

Figure 1:
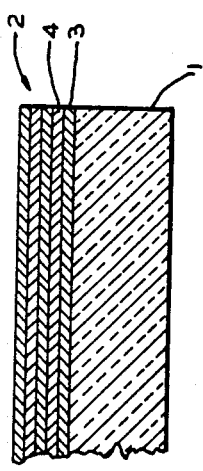

In the accompanying drawings (1 sheet):

FIGURE 1 is a fragmentary vertical sectional view of an optical device constructed in accordance with and embodying the present invention; and FIGURE 2 is a plot of optical efficiency of the device showing the wave length in microns of radiation incident thereupon as a function of the refractive index of manganese sulfide.

Generally speaking, the present invention resides in a discovery that a selected compound, namely manganese sulfide, exhibits excellent optical characteristics for use in multilayer optically thin films. It has been found that this compound has a high index of refraction and is capable of thin film deposition by a thermal evaporation process. Moreover, this compound forms a tightly adherent film, and shows good abrasion resistent qualities. It has the further advantage of strong absorption of light of wave length below 0.4 micron and thus provides an excellent medium on selective blocking of ultra-violet light.

Referring now in more detail and by reference characters to the drawings, which illustrate a preferred embodiment of the present invention, A designates an optical device for the selective transmittance and reflectance of radiation which generally comprises a subtrate 1 having an optically thin film 2 disposed on one of the flat surfaces thereof. The substrate 1 is transparent in the region in which it is desired to transmit radiation. For example, if is desired to transmit visible radiation, the substrate 1 is transparent in the visible wave length range. The optically thin film 2 generally comprises alternating layers of high index of refraction and low index of refraction materials. In the present invention, the first layer 3 is a high index of refraction layer formed of manganese sulfide. The second layer 4 is a low index of refraction layer formed of any of the compounds described hereinbelow. The remaining layers in the device are of alternating high and low index of refraction layers. The film 2 may comprise any desired number of layers and the method of determining the number of layers is more fully described in my copending application Ser. No. 299,851 filed Aug. 5, 1963, now U.S. Patent No. 3,410,625.

It should be noted, that manganese is a heavy element which has a large number of electrons surrounding the nucleus and thereby provides a high index of refraction. Manganese has an atomic number of 25 and an atomic weight of 54.93 and appears in Group VIIa of the Periodic Table. Manganese has a number of valence states such as univalent manganese, bivalent and trivalent manganese. Manganese also occurs in the tetravalent state, the pentavalent, heptavalent and hexavalent states. In the sulfide salt manganese is bivalent. Manganese disulfide which occurs as the reddish brown mineral haverite is not suitable for use as an optically thin film. The manganese sulfide would be used in conjunction with alternating layers of a dielectric material having a relatively low refractive index, such as magnesium fluoride, cryolite, calcium fluoride, lithium fluoride, aluminum fluoride, calcium silicate, and aluminum oxide.

Manganese sulfide is conveniently applied through the thermal evaporation process. The thermal evaporator is normally operated at a temperature where the compounds have a vapor pressure of not less than 2.0 microns and not more than 25.0 microns, and preferably about 10 microns. The pressure of the gas is obviously fixed at any selected temperature. Moreover, the rate at which the molecules of the material strikes the substrate is determined by the vapor pressure thereof. With these vapor pressures, a film thickness of up to 1500 Angstroms can be formed in about 150 seconds. It has been found, in connection with the present invention, that the material from which the substrate is formed has no material effect in the application of the thin film. The refractive index of the substrate of course, does materially affect the optics of the system since the substrate is sufficiently thick so that it constitutes a "massive" layer.

The optical devices are prepared by the thermal evaporation process as indicated above. The substrate, may be selected from various solids such as crystals, glasses and plastics. These substrates must be tranparent in the region of radiation pasing therethrough and they must be quite clean. Usually ultrasonic cleaning or a suitable detergent may be employed for cleaning the entire surface. Thereafter, the surface may be rinsed in de-ionized water. The surface may also be de-greased with a suitable alcohol, such as isopropyl alcohol permitting the surface to air dry. The evaporator must also be maintained in a relatively clean condition. The aluminum oxide crucible which holds the liquid material has been found to be far superior than any other type of crucible particularly with manganese sulfide. Generally, the manganese sulfide has a tendency to absorb some of the impure elements which are contained in a crucible made of materials other than aluminum oxide. Accordingly, this material has been found to be far superior to any other for the construction of the crucible. The substrate may also be provided with a relatively thin layer of stannic oxide in order to provide a degree of electrical conductivity. The stannic oxide has a refractive index which is less than the manganese sulfide and also has a thickness which is substantially thin so that it does not interfere with the optics of the system.

Various spectrophotometric analyses were made with substrates containing manganese sulfide. The reflectance and absorption can be obtained by calculation of the equations set forth in copending application Ser. No. 423,263, filed Jan. 4, 1965 entitled Pellucid Laminates and the Method of Making the Same. It has been found that manganese sulfide has a refraction curve which is illustrated in FIGURE 2 and shows the wave length in microns of the radiation maintained thereupon vs. the refractive index of manganese sulfide.

The low refractive index layers such as magnesium fluoride, cryolite, etc., are also conveniently applied by the thermal evaporation process using almost identical application conditions. The optically thin films, are usually formed of alternating layers of high refractive index materials and low refractive index materials, the thickness of each of the layers being determined by the desired optical qualities to be obtained. The method of selecting the thickness of the films of the various layers is more fully described in copending application, Ser. No. 299,851 filed Aug. 5, 1963 by James W. Edwards now U.S. Patent No. 3,410,625 and is, therefore, not described in more detail herein. However, when the multi-layer films are used for interference filters and heat reflecting films, the thickness of the high dielectric layer usually ranges from 0.05 micron to 0.20 micron. The thickness of the low dielectric layer usually ranges from 0.12 to 0.22 micron.

Manganese sulfide is also useful as a single layer film. These single layer films are advantageously employed as anti-reflection layers in solar cells or in beam splitters. For example, it is often desirable to separate wave length ranges of radiation without much selectivity and a layer formed of the manganese sulfide is particularly effective for such purposes. Manganese sulfide has been found to be a rather unique compound for use as an optically thin film in multi-layer film structures. This material, when combined with a suitable low index of refraction material, such as those listed above has been found to become completely opaque when radiation with a wave length substantially of 0.4 micron or less is incident thereupon, i.e. manganese sulfide is opaque to ultra-violet rays. In other words, this material serves as type of optical switch which prevents radiation of less than 0.4 micron from being transmitted. Thin film devices of manganese sulfide thus have the unique property of cutting off ultra-violet radiation from sunlight and electric arc sources. For example a heat reflecting filter for motion picture projectors designed to pass visible light has a broad infra-red reflection region and an ultra-violet absorption region to protect the film from heat and the deleterious effects of ultraviolet rays. The high refractive index of manganese sulfide provides an effective filter with fewer layers than previously used zinc sulfide or ceric oxide.

It was found, that when manganese sulfide was applied as an optically thin film to transparent substrates, such as glass and quartz, massive plastic layers such as polyvinylbutyral, or optical crystalline substances such as sodium chloride, potassium chloride or calcium fluoride, the film exhibited excellent adherence characteristics. Adhesively coated tapes were pressed onto the surface of the film and removed to determine the degree of film adherence. Rapid stripping indicated that the film could not be lifted by the adhesive. Moreover, this film failed to readily dissolve in water or organic solvents such as benzene, toluene, carbon tetrachloride and xylene.

The invention is further illustrated by, but not limited to, the following examples.

EXAMPLE 1

An optically thin film having four alternating layers of manganese sulfide which is the high index of refraction material and three alternating layers of a low index of refraction material (magnesium fluoride) are applied to a glass substrate to selectively alter the optical characteristics of the substrate.

The manganese sulfide is applied to the glass substrate having a surface area of 120 square centimeters and a thickness of 0.3 centimeter, by the thermal evaporation process, until a film thickness of 902 Angstroms per layer is obtained. The manganese sulfide is heated in the aluminum oxide crucible of the thermal evaporator to a temperature where it is capable of being vapor deposited at a rate of 400 Angstroms thickness per minute. The magnesium fluoride is applied by the thermal evaporation process as a thin film with a thickness of 1640 Angstroms per layer to the outer surface of the manganese sulfide film. The magnesium fluoride is applied at a rate to deposit 660 Angstroms per minute in thickness of film to the entire surface area of the substrate.

When light having the spectral distribution of solar radiation is directed on the film at an angle of incidence of 0°, approximately 87% of the light within the infrared wave length range (0.70 to 1.15 microns) is reflected. Moreover, approximately 87% of the light within the visible wave length range (0.40 to 0.70 micron) is transmitted through the film. When light having the same spectral distribution, that is the spectral distribution of solar radiation, is directed on the film at an angle of incidence of 30°, the reflectance of the infra-red light is 91% and the transmittance of the visible light is 86%. Moreover, approximately 44% of the incident energy carried by the light directed on the film, is in the visible wave length range and only approximately 13% of the energy in this wave length range is reflected. On the other hand, approximately 55% of the incident energy in the light directed on the film is in the infra-red wave length range and approximately 69% of this energy is reflected. The ultra violet transmission of this film fell below 1% at wave lengths below .375 micron, was 10% at .39 micron and 15% at .40 micron.

EXAMPLE 2

An optically thin film having four alternating layers of manganese sulfide which is the high index of refraction material and three alternating layers of a low index of refraction material (cryolite) are applied to a glass substrate to selectively alter the optical characteristics of the substrate.

The manganese sulfide is applied to the glass substrate having a surface area of 120 square centimeters and a thickness of 0.3 centimeter, by the thermal evaporation process, until a film thickness of 902 Angstroms per layer is obtained. The manganese sulfide is heated in an aluminum oxide crucible of a thermal evaporator to a temperature where it is capable of being vapor deposited at a rate thickness of 480 Angstroms per minute. The cryolite is applied by the thermal evaporation process, as a thin film with a thickness of 1690 Angstroms per layer to the outer surface of the manganese sulfide film. The cryolite is applied at a rate of thickness of 660 Angstroms per minute.

When light having a spectral distribution of solar radiation is directed on the film at an angle of incidence of 0°, approximately 88% of the light within the infra-red wave length range (0.70 to 1.15 microns) is reflected. Moreover approximately 86% of the light within the visible wave length range (0.40 to 0.70 micron) is transmitted through the film. When light having the same spectral distribution, that is the spectral distribution of solar radiation, is directed on the film at an angle of incidence of 30°, the reflectance of the infra-red light is 91% and the transmittance of the visible light is 87%. Moreover, approximately 44% of the incident energy carried by the light directed on the film, is in the visible wave length range and only approximately 11% of the energy in this wave length range is reflected. On the other hand, approximately 55% of the incident energy in the light directed on the film is in the infra-red wave length range and approximately 70% of this energy is reflected.

EXAMPLE 3

An optically thin film having three alternating layers of manganese sulfide which is the high index of refraction material and two alternating layers of a low index of refraction material (calcium fluoride) are applied to a glass substrate to selectively alter the optical characteristics of the substrate.

The manganese sulfide is applied to the glass substrate having a surface area of 120 square centimeters and a thickness of 0.3 centimeter, by the thermal evaporation process, until a film thickness of 902 Angstroms per layer is obtained. The manganese sulfide is heated in the thermal evaporator to a temperature where it is capable of being vapor deposited at a rate of 400 Angstroms per minute. The calcium fluoride is applied by the thermal evaporation process, as a thin film with a thickness of 1600 Angstroms per layer to the outer surface of the manganese sulfide film. The calcium fluoride is applied at a film thickness rate of 500 Angstroms per minute.

When light having a spectral distribution of solar radiation is directed on the film at an angle of incidence of 0°, approximately 84% of the light within the infra-red wave length range (0.70 to 1.15 microns) is reflected. Moreover, approximately 88% of the light within the visible wave length range (0.40 to 0.70 micron) is transmitted through the film. When light having the same spectral distribution, that is the spectral distribution of solar radiation, is directed on the film at an angle of incidence of 30°, the reflectance and transmittance of the infra-red light and the visible light respectively, is substantially similar to the results obtained when the light is directed at an angle of incidence of 0°. Moreover, approximately 44% of the incident energy carried by the light directed on the film, is in the visible wave length range and only approximately 12% of the energy in this wave length range is reflected. On the other hand, approximately 55% of the incident energy in the light directed on the film is in the infra-red wave length range and approximately 68% of this energy is reflected.

EXAMPLE 4

Four alternating layers of a solid solution of zinc sulfide and manganese sulfide are applied to a glass substrate having a surface area of 120 square centimeters and a thickness of 0.3 centimeter, by the thermal evaporation process, until a film thickness of 938 Angstroms per layer is obtained. The zinc sulfide and manganese sulfide are heated in an aluminum oxide crucible of thermal evaporator to a temperature where they are capable of being applied at a rate of 350 Angstroms per minute. Three alternating layers of magnesium fluoride are applied by the thermal evaporation process, as a thin film with a thickness of 1640 Angstroms per layer to the outer surface of the solid solution zinc sulfide and manganese sulfide film. The magnesium fluoride is applied at a rate of film thickness of 660 Angstroms per minute.

When light having a spectral distribution of solar radiation is directed on the film at an angle of incidence of 0°, approximately 74% of the light within the infra-red wave length (0.70 to 1.15 microns) is reflected. Moreover, approximatley 88% of the light within the visible wave length range (0.40 to 0.70 micron) is transmitted through the film. When light having the same spectral distribution, that is the spectral distribution of solar radiation, is directed on the film at an angle of incidence of 30°, the reflectance and transmittance of the infra-red light and the visible light respectively, is substantially similar to the results obtained when the light is directed at an angle of incidence of 0°. Moreover, approximately 44% of the incident energy carried by the light directed on the film, is in the visible wave length range and only approximately 10% of the energy in this wave length range is reflected. On the other hand, approximately 55% of the incident energy in the light directed on the film is in the infra-red wave length range and approximately 65% of this energy is reflected.

It should be understood that changes and modifications in the form and combination of compounds, presently described and pointed out may be substituted for those herein described without departing from the nature and principle of my invention.

Having thus described my invention what I desire to claim and secure by Letters Patent is:

1. An optical device for selective reflectance and transmittance of radiation over an extended spectral range comprising a substrate which is transparent in the wave length range in which it is desired to transmit radiation, said substrate having a surface carrying an optically thin film having at least two alternating optically active layers, at least one and no more than four optically active layers having a high index of refraction and being formed of a thermally evaporated manganese sulfide salt of high optical homogeneity, and at least one optically active layer having an index of refraction substantially less than that of manganese sulfide to enable occurrence of optical interference phenomena, the thickness of the layer with the high index of refraction being within the range of 0.05 to 0.20 micron so that it will selectively reflect radiation in a given wave length range and selectively transmit radiation in a given wave length range when radiation of an extended spectral range is incident thereupon and the thickness of the low index of refraction layer being within the range of 0.12 to 0.22 micron.

2. A filter for the selective reflectance of radiation within the ultraviolet radiation wave length range, said filter comprising a substrate which is transparent in the visible wave length range, said substrate having at least two alternating optically active layers, at least one and no more than four optically active layers having a high index of refraction and being formed of a thermally evaporated manganese sulfide salt of high optical homogeneity, and at least one layer having an index of refraction substantially less than that of manganese sulfide to enable occurrence of optical interference phenomena, the thickness of the layer with the high index of refraction being within the range of 0.05 to 0.20 micron so that it will selectively reflect radiation in a given wave length range and selectively transmit radiation in a given wave length range when radiation of an extended spectral range is incident thereupon and the thickness of the low index of refraction layer being within the range of 0.12 to 0.22 micron.

3. An optical device for selective reflectance and transmittance of radiation over an extended spectral range comprising a substrate which is transparent in the wave length range in which it is desired to transmit radiation, said substrate having a surface carrying an optically thin film having at least two alternating optically active layers, at least one and not more than four optically active layers having a high index of refraction and being formed of a thermally evaporated manganese sulfide salt of high optical homogeneity, and at least one optically active layer having an index of refraction substantially less than that of manganese sulfide to enable occurrence of optical interference phenomena, the optically active layers having an index of refraction sufficiently less than manganese sulfide being selected from the class consisting of magnesium fluoride, cryolite, calcium fluoride, lithium fluoride, aluminum fluoride, calcium silicate and aluminum oxide, the thickness of the layer with the high index of refraction being within the range of 0.05 to 0.20 micron so that it will selectively reflect radiation in a given wave length range and selectively transmit radiation in a given wave length range when radiation of an extended spectral range is incident thereupon and the thickness of the low index of refraction layer being within the range of 0.12 to 0.22 micron.

References Cited
UNITED STATES PATENTS

| | | | |
|---|---|---|---|
| 2,391,595 | 11/1968 | Richards et al. | 117—69 |
| 2,624,238 | 1/1953 | Widdop et al. | 117—33.3 |
| 2,659,678 | 11/1953 | Cusano et al. | 117—106 |
| 2,932,592 | 4/1960 | Cameron | 117—33.3 |
| 3,188,513 | 6/1965 | Hansler | 117—33.3 |

OTHER REFERENCES

Holland: Vapor Deposition of Thin Films, pp. 294–297, John Wiley & Sons, New York, N.Y., 1956.

WILLIAM D. MARTIN, Primary Examiner

MATHEW R. P. PERRONE, Jr., Assistant Examiner

U.S. Cl. X.R.

350—1; 117—33.3, 69, 106, 124, 138.8